US009177451B2

(12) United States Patent
Calman et al.

(10) Patent No.: US 9,177,451 B2
(45) Date of Patent: Nov. 3, 2015

(54) MOBILE DEVICE AS POINT OF TRANSACTION FOR IN-STORE PURCHASES

(71) Applicant: Bank of America Corporation, Charlotte, NC (US)

(72) Inventors: Matthew A. Calman, Charlotte, NC (US); David M. Grigg, Rock Hill, SC (US); Carrie Anne Hanson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 368 days.

(21) Appl. No.: 13/785,970

(22) Filed: Mar. 5, 2013

(65) Prior Publication Data

US 2014/0258007 A1 Sep. 11, 2014

(51) Int. Cl.
| | | |
|---|---|---|
| *G06Q 20/12* | (2012.01) | |
| *G06Q 20/32* | (2012.01) | |
| *G06Q 20/34* | (2012.01) | |
| *G07G 1/00* | (2006.01) | |

(52) U.S. Cl.
CPC ............ *G07G 1/0081* (2013.01); *G06Q 20/127* (2013.01); *G06Q 20/322* (2013.01); *G06Q 20/3224* (2013.01); *G06Q 20/3276* (2013.01); *G06Q 20/3567* (2013.01)

(58) Field of Classification Search
None
See application file for complete search history.

(56) References Cited

U.S. PATENT DOCUMENTS

| 5,437,346 | A | 8/1995 | Dumont | |
|---|---|---|---|---|
| 7,472,081 | B1 | 12/2008 | Cason | |
| 7,988,045 | B2 | 8/2011 | Connell, II et al. | |
| 8,626,530 | B1 * | 1/2014 | Tran et al. | 705/2 |
| 2010/0094726 | A1 * | 4/2010 | Tuli | 705/26.1 |
| 2011/0320296 | A1 | 12/2011 | Edwards | |
| 2012/0173551 | A1 | 7/2012 | Haddorp et al. | |
| 2013/0046691 | A1 * | 2/2013 | Culton | 705/44 |
| 2013/0054395 | A1 * | 2/2013 | Cyr et al. | 705/21 |

OTHER PUBLICATIONS

Tode, Chantal. "*Walmart speeds up checkout, lets shoppers scan items via iPhone.*" Published Sep. 5, 2012. http://www.mobilecommercedaily.com/walmart-speeds-up-checkout-lets-shoppers-scan-items-themselves-via-iphone. Mobile Commerce Daily. 4 pages. Retrieved Mar. 22, 2013.
RISNews.edgl.com. "*Supermarket Retailer Rolls Out Self-Checkout Smartphone App.*" http://risnews.edgl.com/retail-news/Supermarket-Retailer-Rolls-Out-Self-Checkout-Smartphone-App81027. 2 page. Retrieved Mar. 29, 2013.

(Continued)

*Primary Examiner* — Allen Chein
(74) *Attorney, Agent, or Firm* — Michael A. Springs; Moore & Van Allen PLLC; James C. Edwards (57) ABSTRACT

Systems, methods and computer programs provide for implementing a mobile communication device, such as a smart telephone or the like, as a point of transaction for in-store purchases, such that all a customer needs to do is capture the coded indicia of products they desire (i.e., scan the products) with their mobile communication device as they shop and the purchase transaction will subsequently occur based on either the customer (in possession of the mobile communication device) being physically located in a designated area of the store or the lapse of a predetermined period of time from when the coded indicia was captured.

11 Claims, 5 Drawing Sheets

(56) References Cited

OTHER PUBLICATIONS

QThru.com "*QThru: use your mobile smartphone for self-checkout.*" http://www.qthru.com/. QThru.com © 2011. 6 pages. Retrieved Mar. 22, 2013.

Zimmerman, Ann. "*Check Out the Future of Shopping: Shaving Time Off the Weekly Grocery Run To Keep Consumers in Stores and Spending.*" http://online.wsj.com/article/SB10001424052748703421204576329530406374 00.html. 5 pages. Retreived Mar. 22, 2013.

\* cited by examiner

MOBILE DEVICE AS POINT OF TRANSACTION FOR IN-STORE PURCHASES

FIELD OF THE INVENTION

In general, embodiments herein disclosed relate to commerce and, more specifically using a mobile communication device as a point of transaction for in-store purchases.

BACKGROUND

Retailers are always trying to find ways to make the customer's experience more enjoyable. One way to make the customer experience more enjoyable is to make the overall shopping experience more efficient. In this regard, the less time that a customer spends shopping typically equates to a more enjoyable experience.

Retailers, such as grocery stores and the like, have recently implemented self-checkouts that allow the customer to scan and bag their items as a means of adding efficiency to the check-out process. Such self-checks outs have been welcomed by the customer and, as such, more and more self-checks are being added at grocery stores and other in-store locations to accommodate there widespread customer acceptance. However, while self-checkouts impart some degree of accelerating the check-out process, self-checks are not without their limitations and drawbacks in terms of check-out efficiency. For example, all too often a customer may experience a problem during the self-check that requires assistance from a self-checkout attendant and/or store manager. In other instances, customers new or not adept at the self-checkout process may add delay for those waiting to use a self out station.

Another drawback of the overall shopping experience is that a customer typically does not know the total amount of their purchase until they reach a check-out station (a sales associate checkout station or a self-checkout station). They only way for a customer to circumvent this problem is to use a calculator as they accumulate the products they desire to purchase and/or keep track of an estimated total purchase amount in their head.

Therefore, a need exists to create new ways for customers to conduct a purchase transaction (i.e., checkout) within retail locations. The desired purchase transaction system should be highly efficient so as to limit the amount of time that a customer spends at the retail location. Moreover, the desired purchase transaction system should allow customers the ability to track the total purchase amount as they shop and acquire products which they desire to purchase.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, apparatus systems and computer program products are described herein that provide for implementing a mobile communication device, such as a smart telephone or the like, as a point of transaction for in-store purchases, such that all a customer needs to do is capture the coded indicia of products they desire (i.e., scan the products) with their mobile communication device as they shop and the purchase transaction will subsequently occur based on either the customer (in possession of the mobile communication device) being physically located in a designated area of the store or the lapse of a predetermined period of time from when the coded indicia was captured. Geo-fencing or the like may be used in conjunction with the mobile communication device to track where the customer is physically located within (and in some embodiments external to) the retail location. For example, a "hot spot" area may be designated within the store, such that the presence of the customer in the "hot spot" (as determined by their mobile communication device) automatically results in the purchase transaction being consummated for the products associated with the coded indicia the customer has captured. The customer merely moving through the "hot spot" area completes the purchase transaction without the need for the customer to present the products to a sales associate and/or rescan the products at a check-out terminal. In other examples, the designated area may be a specified automated checkout exit way, such that customer (in possession of the mobile communication device) passage through the exit way completes the purchase transaction. In another example, the designated area may be defined by an exterior perimeter of the retail location, such that customer (in possession of the mobile communication device) passage from inside the perimeter to outside the perimeter competes the purchase transaction.

A system for conducting purchase transactions within a retail location defines first embodiments of the invention. The system includes a mobile communication device including a computing platform having a processor and a memory in communication with the processor. The memory of the mobile communication device stores a product selection application that is executable by the processor of the mobile communication device and configured to capture computer-readable indicia associated with one or more products that a customer desires to purchase. The computer-readable indicia is captured prior to the customer encountering a check-out location within the retail location and the computer-readable indicia, when read by a computing device processor, provides information operable to purchase an associated product. The system further includes a computing device including a computing platform comprising a processor and a memory in communication with the processor. The memory of the computing device stores a purchase transaction application that is executable by the processor and configured to receive the information from the mobile communication device and conduct a purchase transaction of the one or more products for the customer in automatic response to one of (1) the customer and the mobile communication device entering a designated physical area associated with the retail location, or (2) lapse of a predetermined period of time from when the computer-readable indicia was captured.

In specific embodiments of the system, the purchase transaction application is further configured to conduct the purchase transaction of the one or more products in automatic response to the customer entering the designated physical area defined as one of (1) located within the retail location, (2) a specified exit way from the retail location, (3) located outside an external perimeter of the retail location or (4) a predetermined distance from where the computer-readable indicia was captured.

In other specific embodiments of the system, the customer is in a pre-existing trusted relationship with the retailer, such that the trusted relationship is operable to authorize the customer to conduct the purchase transaction.

In still further specific embodiments of the system, the purchase transaction application is further configured to generate and initiate communication of a purchase receipt to the mobile communication device. The receipt indicates that the customer has completed the purchase transaction of the one or more products In other additional embodiments of the system, the purchase transaction application is further configured to, in response to communicating the information, generate and communicate a notification to a warehouse associated with the retailer. The notification is operable to notify warehouse personnel of a need to ready the product for presentation to the customer.

A method for conducting purchase transactions within a retail location defines second embodiments of the invention. The method includes capturing, by a mobile communication device, computer-readable indicia associated with one or more products that a customer desires to purchase at a retail location. The computer-readable indicia is captured prior to the customer encountering a check-out location within the retail location and the computer-readable indicia, when read by a computing device processor, provides information operable to purchase an associated product. The method additionally includes communicating wirelessly, by the mobile communication device, the information to a purchase transaction system associated with the retailer. Moreover, the method includes conducting, by a computing device processor, a purchase transaction of the one or more products in automatic response to one of (1) the customer and the mobile communication device entering a designated physical area associated with the retail location, or (2) lapse of a predetermined period of time from when the computer-readable indicia was captured.

In specific embodiments of the method conducting the purchase transaction further comprises conducting, by the computing device processor, the purchase transaction of the one or more products in automatic response to the customer entering the designated physical area defined as one of (1) located within the retail location, (2) a specified exit way from the retail location, (3) located outside an external perimeter of the retail location or (4) a predetermined distance from where the computer-readable indicia was captured.

In other specific embodiments of the method, the customer is in a pre-existing trusted relationship with the retailer, such that, the trusted relationship is operable to authorize the customer to conduct the purchase transaction.

In still further embodiments the method includes, in response to conducting the purchase transaction, communicating, to the mobile communication device, a purchase receipt that indicates that the customer has completed the purchase transaction of the one or more products.

In additional specific embodiments the method includes, in response to communicating the information, communicating, by a computing device processor, a notification to a warehouse associated with the retailer, wherein the notification is operable to notify warehouse personnel of a need to ready the product for presentation to the customer.

A computer program product including a non-transitory computer-readable medium defines third embodiments of the invention. The computer-readable medium provides for computer-executable instructions to cause a computer to implement the steps of (1) capturing computer-readable indicia associated with one or more products that a customer desires to purchase at a retail location, wherein the computer-readable indicia is captured prior to the customer encountering a check-out location within the retail location and, wherein the computer-readable indicia, when read by a computing device processor, provides information operable to purchase an associated product, (2) communicating wirelessly the information to a purchase transaction system associated with the retailer, and (3) conducting a purchase transaction of the one or more products in automatic response to one of (1) the customer and the mobile communication device entering a designated physical area associated with the retail location, or (2) lapse of a predetermined period of time from when the computer-readable indicia was captured.

Thus, systems, apparatus, methods and computer products are described in more detail below that provide for implementing a mobile communication device, such as a smart telephone or the like, as a point of transaction for in-store purchases, such that all a customer needs to do is capture the coded indicia of products they desire (i.e., scan the products) with their mobile communication device as they shop and the purchase transaction will subsequently occur based on either the customer (in possession of the mobile communication device) being physically located in a designated area of the store or the lapse of a predetermined period of time from when the coded indicia was captured.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Methods, apparatus systems and computer program products are described herein that provide for implementing a mobile communication device, such as a smart telephone or the like, as a point of transaction for in-store purchases, such that all a customer needs to do is capture the coded indicia of products they desire (i.e., scan the products) with their mobile communication device as they shop and the purchase transaction will subsequently occur based on either the customer (in possession of the mobile communication device) being physically located in a designated area of the store or the lapse of a predetermined period of time from when the coded indicia was captured. Geo-fencing or the like may be used in conjunction with the mobile communication device to track where the customer is physically located within (and in some embodiments external to) the retail location. For example, a "hot spot" area may be designated within the store, such that the presence of the customer in the "hot spot" (as determined by their mobile communication device) automatically results in the purchase transaction being consummated for the products associated with the coded indicia the customer has captured. The customer merely moving through the "hot spot" area completes the purchase transaction without the need for the customer to present the products to a sales associate and/or rescan the products at a check-out terminal. In other examples, the designated area may be a specified automated checkout exit way, such that customer (in possession of the mobile communication device) passage through the exit way completes the purchase transaction. In another example, the designated area may be defined by an exterior perimeter of the retail location, such that customer (in possession of the mobile communication device) passage from inside the perimeter to outside the perimeter competes the purchase transaction.

Figure 1:
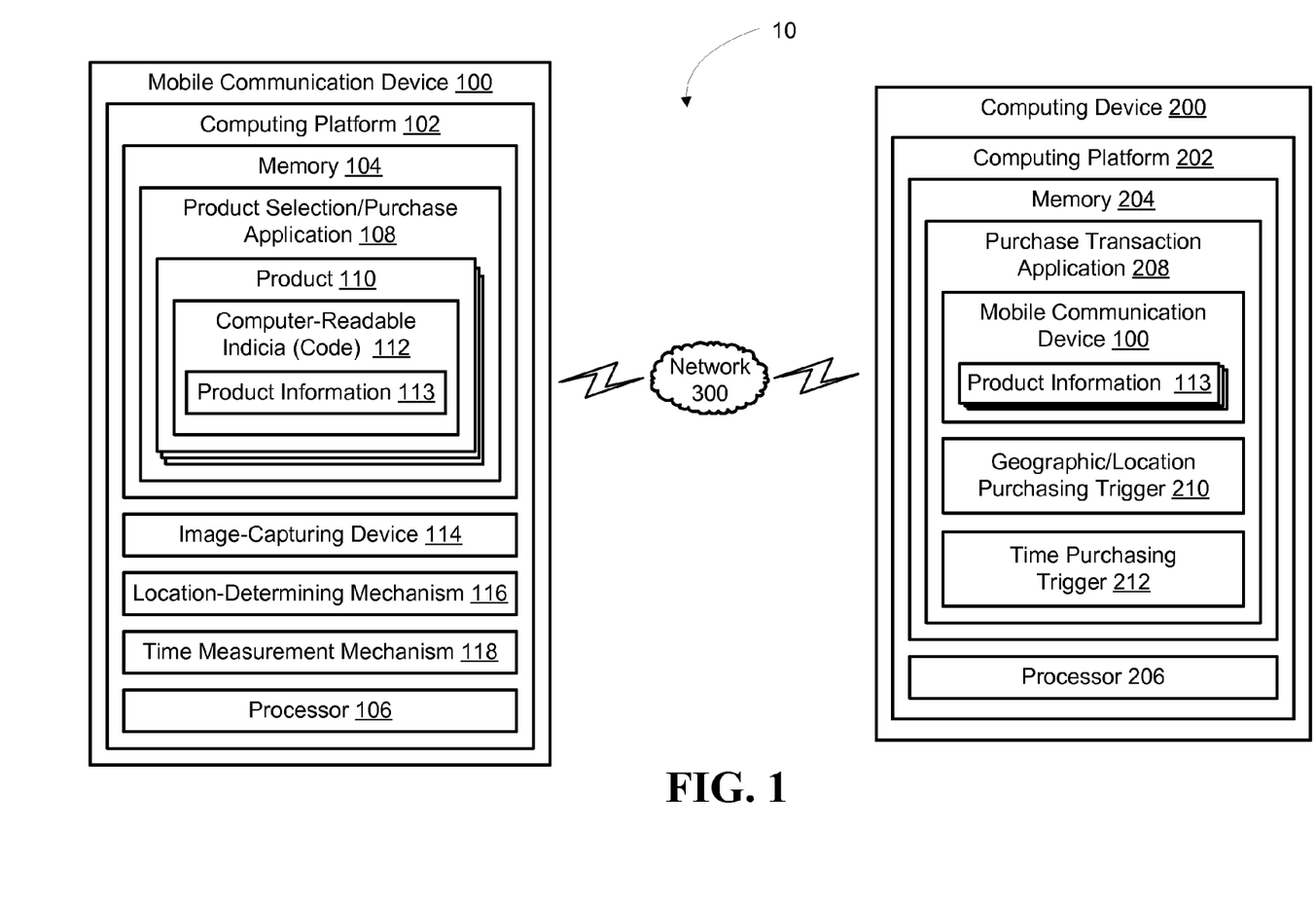
FIG. 1 is a block diagram illustrating a system for implementing a mobile communication device as a point of transaction for in-store purchases, in accordance with an embodiment of the invention.

FIG. 1 illustrates a block diagram of a system 10 for using a mobile communication 100 as a point of transaction for in-store purchases, in accordance with specific embodiments of the present invention. The system 10 includes a mobile communication device 100 that is in the possession of a customer while located at retail location, store or any physical location that offers products. The mobile communication device 100 will typically be a smart cellular telephone, however, in other embodiments the mobile communication device may be a personal digital assistant (PDA), a mobile Internet accessing device, a laptop/portable computer, or other mobile communication device capable of executing applications and communicating via a wireless network 300, which may be a cellular network, and/or a data network, such as the Internet or the like.

The mobile communication device 100 includes a computing platform 102 having a memory 104 and at least one processor 106 in communication with the memory 104. The memory 104 stores product selection/purchase application 108 that is configured to allow the user/customer, in conjunction with an image capturing device 114 included with the mobile communication device 100, to capture computer-readable indicia 112 associated with products that the customer desires to purchase. The computer-readable indicia, which may be a Universal Product Code (UPC) or the like, may be disposed on the product or may be disposed on a placard or advertisement located near the product or a product display. The computer-readable indicia when read by a computing device provides product-related information 113 that is operable to purchase the associated product, such as product price, description and the like.

It should be noted that the customer will capture the indicia related to products that they desire to purchase while they are shopping for products at the retail location (i.e., prior to encountering a checkout station/location within the retail location). For example, a customer will pick up a product they desire to purchase, capture the indicia on the product (i.e., scan the product) and place the product in their shopping cart/basket.

The mobile computing device 100 additionally includes at least one of a location determining mechanism 116 and/or a time measurement mechanism 118. As discussed infra., completion of the purchase transaction may be triggered to automatically occur based on the mobile communication device 100 entering or residing in a designated geographic location. In such embodiments, a requisite location determining mechanism is required to determine the current geographic location of the mobile communication device 100. In other embodiments of the invention the purchase transaction may be triggered to automatically occur based on a lapse of a predetermined time from when indicia was captured. In such embodiments, a requisite time measurement (e.g., clock) mechanism is required to determine the lapse of predetermined period of time.

The system additionally includes computing device 200, such as a server, that is associated with the retail location/store. The computing device may be physically located at the retail location or, in other embodiments, located remotely from the retail location. The computing device 200 may be any computing device capable of executing applications and receiving communications from mobile communication device 100 via network 300.

The computing device 200 includes a computing platform 202 having a memory 204 and at least one processor 206 in communication with the memory 204. The memory 204 stores purchase transaction application 208 that is configured to wirelessly receive the product information 113 from mobile communication device 100 and complete the purchase transaction for the products 110 associated with the product information 113 in automatic response to a geographic/location purchasing trigger 210, such as the customer, in possession of the mobile communication device, entering a designated physical area associated with the retail location. In other embodiments of the invention, the purchase transaction application 208 will complete the purchase transaction in automatic response to a time purchasing trigger 212, such as lapse of a predetermined period of time from when the computer-readable indicia 112 was last captured by the mobile communication device 100. It should be noted that the mobile communication device 100 will be recognizable to the purchase transaction application 208 as the mobile communication device belonging to the customer based on the customer having previously registered the mobile communication device in an automated/mobile communication device purchase program offered by the retailer/store. In addition, as discussed in relation to FIG. 2, the purchase transaction application 208 will have access to a customer profile which specifies the payment account to be applied to the purchase transaction based on customer configuration.

Figure 2:
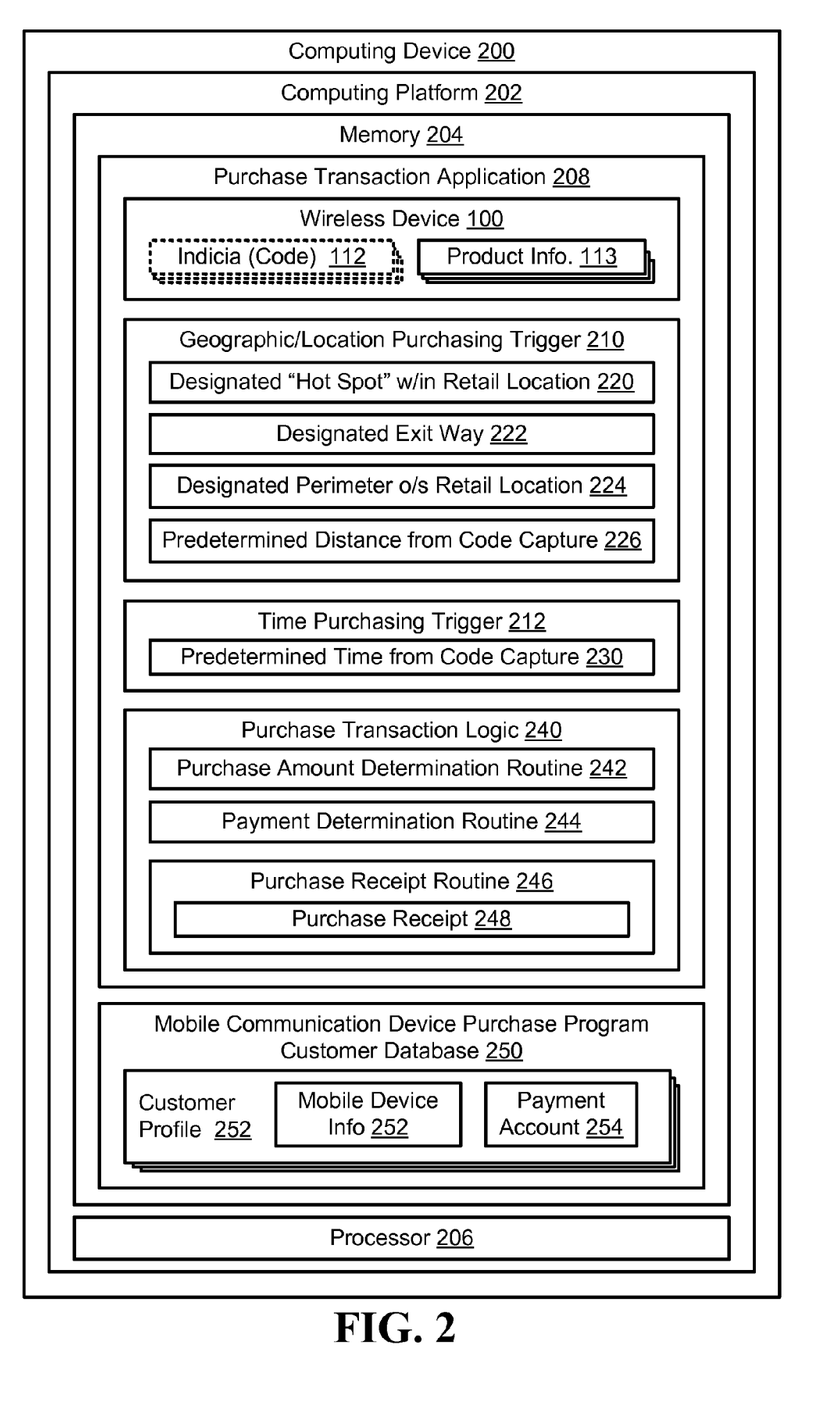
FIG. 2 is a block diagram illustrating a computing device for executing the purchase transaction system based on implementing a mobile communication device as a point of transaction, in accordance with an embodiment of the invention.

Referring to FIG. 2, shown is a more detailed block diagram of the computing device 200, according to embodiments of the present invention. The computing device 200 is configured to be implemented for completing the purchase transaction. In addition to providing greater detail, FIG. 2 highlights various alternate embodiments of the invention.

The computing device 200, which may comprise more than one unit or devices, such as multiple servers or the like, includes computing platform 202 that can receive and execute algorithms, such as routines, and applications. Computing platform 202 includes memory 204, which may comprise volatile and non-volatile memory, such as read-only and/or random-access memory (RAM and ROM), EPROM, EEPROM, flash cards, or any memory common to computer platforms. Further, memory 204 may include one or more flash memory cells, or may be any secondary or tertiary storage device, such as magnetic media, optical media, tape, or soft or hard disk.

Further, computing platform 202 also includes processor 206, which may be an application-specific integrated circuit ("ASIC"), or other chipset, processor, logic circuit, or other data processing device. Processor 206 or other processor such as ASIC may execute an application programming interface ("API") (not shown in FIG. 2) that interfaces with any resident programs, such as service purchase transaction application 208 and algorithms associated therewith or the like stored in the memory 204 of the computing device 200.

Processor 206 includes various processing subsystems embodied in hardware, firmware, software, and combinations thereof, that enable the functionality of computing device 200 and the operability of the apparatus on the network 300. For example, processing subsystems allow for initiating and maintaining communications and exchanging data with other networked devices. For the disclosed aspects, processing subsystems of processor 204 may include any subsystem used in conjunction with service purchase transaction application 208 and related algorithms, sub-algorithms, sub-modules thereof.

Computer platform 202 may additionally include communications module (not shown in FIG. 2) embodied in hardware, firmware, software, and combinations thereof, that enables communications among the various components of the mobile communications device 100, as well as between the other networked devices. Thus, communication module may include the requisite hardware, firmware, software and/or combinations thereof for establishing a network communication connection, receiving product information 113 communicated from wireless device 100.

As previously noted, the memory 104 of mobile communication device 100 stores purchase transaction application 208 that is configured to wirelessly receive the product information 113 from mobile communication device 100 and complete the purchase transaction for the products 110 associated with the product information 113. In alternate embodiments, in which the mobile communication device may not be configured to decode the coded indicia 112, the purchase transaction application 208 may be configured to wirelessly receive the computer-readable indicia 112 from mobile communication device 100 and, subsequently decode the indicia 112 to provide the requisite product information 113.

As previously noted, in certain embodiments of the invention, the purchase transaction application 208 will complete the purchase transaction in automatic response to a geographic/location purchasing trigger 210, such as the customer, in possession of the mobile communication device, entering a designated physical area associated with the retail location. The designated physical area may be defined by application of geo-fencing techniques such that the mobile communication device 100, equipped with requisite location-determining mechanisms 116 can determine when the mobile communication device 100 is located within a particular designated geo-fenced area.

In specific embodiments of the invention the designated geo-fenced area may be a "hot spot" area 220 typically located proximate to conventional check-out counters. The "hot spot" area may be dually marked with signage or the like, such that customer is made aware of where they need go to complete the transaction. The purchaser transaction application 208 is configured to recognize the mobile communication device's presence within the geo-fenced area (i.e., the "hot-spot") and, in response, to the mobile communication device 100 entering the "hot spot" area, automatically complete the transaction. The "hot spot" area may include any additional devices needed to complete the transaction, such as scales or the like needed to weigh product sold on a per/weight basis or the like. In addition, a sales associate may be located at or near the "hot spot" area to confirm, through interfacing with a computing device, completion of the purchase transaction.

In other specific embodiments of the invention the designated geo-fenced area may be a designated exit way 222 The designated exit way may be dually marked with signage or the like, such that customer is made aware of where they need to exit to complete the transaction. The purchaser transaction application 208 is configured to recognize the mobile communication device's passage through the designated geofenced exit way and, in response, to the mobile communication device 100 passing through the exit way, automatically complete the transaction. The exit way may be configured with an authorization mechanism, such as a turnstile engaged by a passcode, passkey or the like, such that only authorized users/customers can gain access to the exit way.

In still further specific embodiments of the invention the designated geo-fenced area may be a designated external perimeter 224 of the retail location/store. For example, a perimeter located a certain distance from the physical building that the retail location occupies. In such embodiments, the purchaser transaction application 208 is configured to recognize the mobile communication device's passage through the designated geo-fenced perimeter and, in response, to the mobile communication device 100 passing through the perimeter, automatically complete the transaction. It should be noted that in such embodiments of the invention, the transaction is not completed until the customer, in possession of the mobile communication device, has already exited the physical location of the retailer/store.

In still further specific embodiments of the invention the designated geo-fenced area may be defined by a predetermined distance 226 from where the indicia was captured. In such embodiments, the purchaser transaction application 208 is configured to recognize that the mobile communication has moved the requisite predetermined distance from where the code was captured and, in response, automatically complete the transaction. It should be noted that since a customer may be apt to purchase multiple products while at the retail location/store, such configuration may lead to multiple purchase transactions occurring or the purchaser transaction application 208 may be configured to queue all transactions confirmed within a designated predetermined period of time and conduct one purchase transactions upon lapse of the predetermined period of time.

In other embodiments of the invention, the purchase transaction application 208 will complete the purchase transaction in automatic response to a time purchasing trigger 212, such as lapse of a predetermined period of time 230 from when the computer-readable indicia 112 was last captured by the mobile communication device 100. It should be noted that since a customer may be apt to purchase multiple products while at the retail location/store, such configuration may lead to multiple purchase transactions occurring or the predetermined period of time 230 may of such length (e.g., an hour or longer) that the customer will likely have completed shopping at the retail location/store when the lapse of the time period occurs.

The purchase transaction application 208 additionally includes purchase transaction logic 240 configured to conduct the purchase transaction based on occurrence of either the geographic location purchasing trigger 210 or the time purchasing trigger 212. The logic 240 includes purchase amount determination routine 242 which is configured to determine a total purchase amount based on all of the products 100 associated with the received product information 113 and any requisite sales tax to be applied to the purchase amount.

The logic 240 additionally includes payment determination routine 242 that is configured to determine to payment account (credit/debit card account or the like) that is to be applied to the transaction. In this regard, payment determination routine 242 accesses mobile communication device purchase program customer database 250 which includes customer profiles 252 for all customers registered to participate in the mobile communication device purchase program. Each profile 252 will include mobile communication device information 252 for one or more devices possessed by the customer and payment account information 254 for one or more payment accounts which the customer desires to be applied to purchase transactions. The mobile communication device information 252 includes the requisite information, such as telephone number or other identifier, needed to correlate the received product information 113 to registered wireless device within the program and, thus, a registered customer. Further, payment account information 254 may be configured by the customer such that the payment account will vary depending on the different parameters, such as product types purchased, time of week, month or year purchase is made, purchase amount or the like.

The purchase transaction amount logic 240 additionally includes purchase receipt routine 246 that is configured to, upon successful completion of the purchase transaction, generate and wirelessly communicate a purchase receipt 248 to the wireless communication device 100 of the customer. The purchase receipt 248 which may in the form of an email or the like includes the payment amount, product description, and any other relevant receipt-type information. In specific embodiments the purchase receipt 248 is immediately communicated to the wireless device 100 upon successful completion of the purchase transaction so that the customer is aware that the transaction has occurred.

Figure 3:
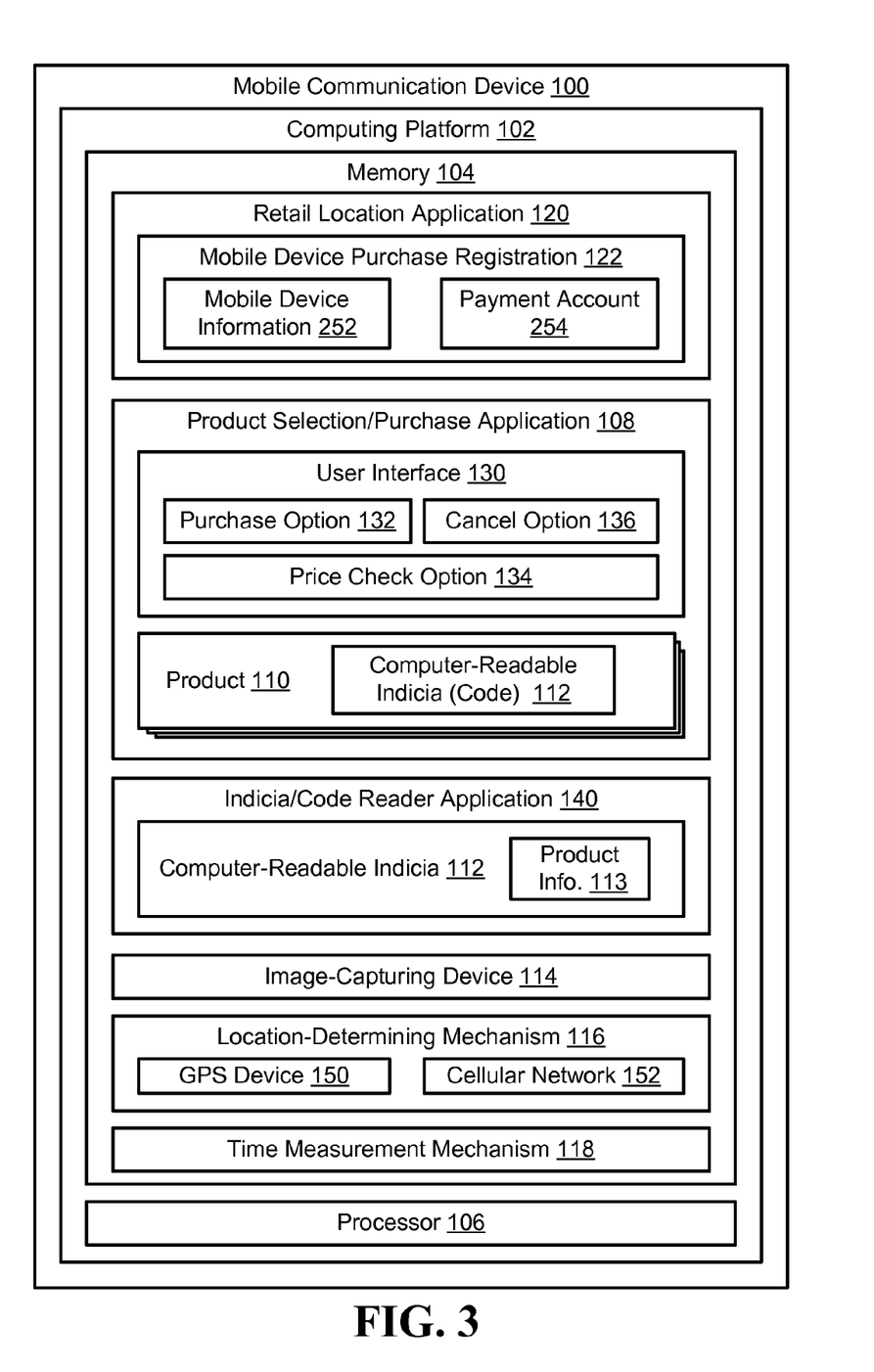
FIG. 3 is a block diagram illustrating a mobile communication device used as point of transaction for in-store purchases, in accordance with an embodiment of the invention.

Referring to FIG. 3, shown is a more detailed block diagram of the mobile communication device 100, according to embodiments of the present invention. The mobile communication device 100 is configured to be implemented as point of transaction device for in-store purchases. In addition to providing greater detail, FIG. 3 highlights various alternate embodiments of the invention.

The mobile communication device 100 includes computing platform 102 that can receive and execute algorithms, such as routines, and applications. Computing platform 102 includes memory 104, which may comprise volatile and non-volatile memory, such as read-only and/or random-access memory (RAM and ROM), EPROM, EEPROM, flash cards, or any memory common to computer platforms. Further, memory 104 may include one or more flash memory cells, or may be any secondary or tertiary storage device, such as magnetic media, optical media, tape, or soft or hard disk.

Further, computing platform 102 also includes processor 106, which may be an application-specific integrated circuit ("ASIC"), or other chipset, processor, logic circuit, or other data processing device. Processor 106 or other processor such as ASIC may execute an application programming interface ("API") (not shown in FIG. 2) that interfaces with any resident programs, such as retail location application 120, product selection/purchase application 108 or indicia/code reader application 140 and algorithms associated therewith or the like stored in the memory 104 of the mobile communication device 100.

Processor 106 includes various processing subsystems embodied in hardware, firmware, software, and combinations thereof, that enable the functionality of mobile communication device 100 and the operability of the apparatus on the network 300. For example, processing subsystems allow for initiating and maintaining communications and exchanging data with other networked devices. For the disclosed aspects, processing subsystems of processor 104 may include any subsystem used in conjunction with retail location application 120, product selection/purchase application 108 or indicia/code reader application 140 and related algorithms, sub-algorithms, sub-modules thereof.

Computer platform 102 may additionally include communications module (not shown in FIG. 2) embodied in hardware, firmware, software, and combinations thereof, that enables communications among the various components of the mobile communications device 100, as well as between the other networked devices. Thus, communication module may include the requisite hardware, firmware, software and/or combinations thereof for establishing a network communication connection and communicating product information 113 to computing device 200.

The memory 104 may store retail location application 120 configured to allow customers to register for the mobile device purchase program. In alternate embodiments registration may occur via network site, such as a retailer's web site or the like, this, obviating the need for the retail location application. The mobile device purchase registration 122 may be configured to receive, from the customer, mobile communication device information 252 for one or more mobile communication devices, such as telephone number or other identifying information and payment account information 254, such as which payment account(s) should be applied to a purchase transaction. As previously noted the payment account/payment vehicle may vary, based on customer configuration of purchase transaction parameters, such as product types, time of transaction, amount of transaction and the like.

The memory 104 stores product selection/purchase application 108 that is configured to allow the user/customer, in conjunction with an image capturing device 114 included with the mobile communication device 100, to capture computer-readable indicia 112 associated with products that the customer desires to purchase. The application 108 may be configured to provide for display of a user interface 130, such as a graphical user interface that allows the customer to capture the computer-readable indicia 112 and based on the customer's desire, choose a purchase option 132, a price check option 134 or a cancel purchase 136. Selection of the purchase option 132 is configured to initiate communication of the product information 113 to the purchase transaction system. Selection of the price check 134 is configured to display the price of the product but not purchase the product (i.e., not initiate communication of the product information 113 to the purchase transaction system). Selection of the cancel purchase option 136 is configured to cancel the purchase by other not initiating communication of the product information 113 to the purchase transaction system if the information has yet to be communicated or, in the event the information has been communicated, sending other information to the purchase transaction system that overrides the purchase request. Thus, the cancel purchase option 136 may be invoked by the customer at any point in time prior to entering the designated area in which the purchase transaction automatically occurs or prior to the lapse of the designated period of time from when the indicia was captured.

The memory 104 of mobile communication device 100 includes indicia/code reader application configured to decode the indicia 112 to result in the product information 113 associated with the product. In alternate embodiments of the invention, the computer-readable indicia will be communicated to the transaction purchasing system, obviating the need to include the indicia reader application 140 on the wireless communication device 100.

The mobile computing device 100 additionally includes at least one of a location determining mechanism 116, such as a Global Positioning System (GPS) device 150 or cellular network device 152, and/or a time measurement mechanism 118, such as a clock or the like. As discussed infra., completion of the purchase transaction may be triggered to automatically occur based on the mobile communication device 100 entering or residing in a designated geographic location. In such embodiments, a requisite location determining mechanism is required to determine the current geographic location of the mobile communication device 100. In other embodiments of the invention the purchase transaction may be triggered to automatically occur based on a lapse of a predetermined time from when indicia was captured. In such embodiments, a requisite time measurement (e.g., clock) mechanism is required to determine the lapse of predetermined period of time.

Figure 4:
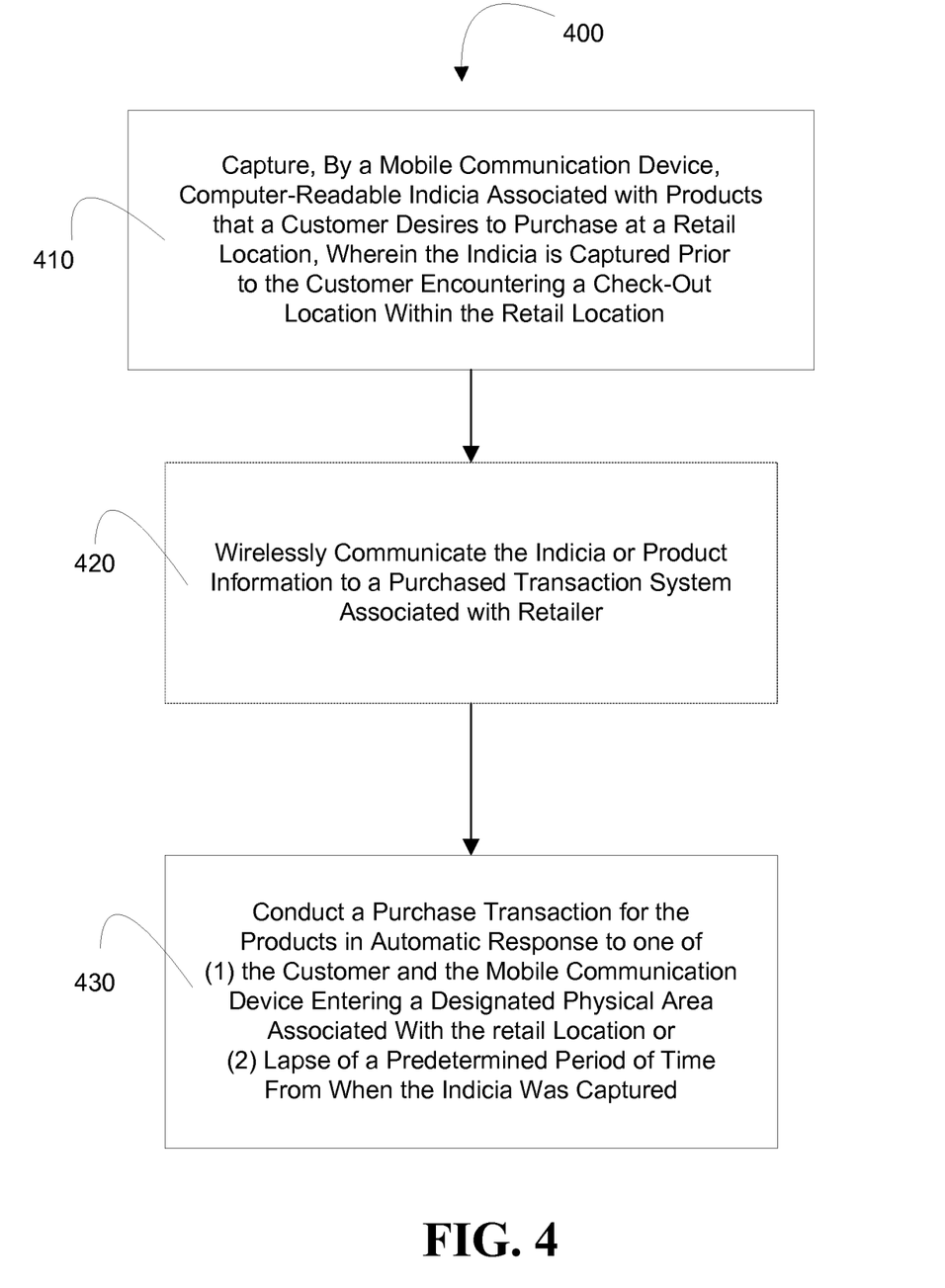
FIG. 4 is a flow diagram illustrating a method for implementing a mobile communication device as a point of transaction for in-store purchases, in accordance with an embodiment of the invention.

Referring to FIG. 4 a flow diagram is presented of a method 400 for using a mobile communication device as a point of transaction for in-store purchases, in accordance with embodiment of the present invention. At Event 410, a computer-readable indicia associated with a product that a customer desires to purchase is captured by an image capturing mechanism within a customer's mobile communication device. The indicia, when read by a computing device, provided product information, such as price, description and the like. The indicia is captured by the mobile communication device prior to the customer encountering a conventional checkout location/counter within the retail location. Typically, such capture of the indicia occurs as the customer is shopping throughout the retail location (e.g., pick up products, capture/scan indicia and place products in shopping cart).

At Event 420, the indicia or the product information is wirelessly communicated from the mobile communication device to a purchase transaction system. In the event the mobile communication device is not configured with indicia reading capabilities, the indicia will be communicated to the purchase transaction system for subsequent reading/decoding.

At Event 430, the purchase transaction is automatically conducted in response to one of (1) the customer, in possession of the mobile communication device, entering a designated physical area associated with the retail location, or (2) lapse of a predetermined period of time from which the indicia was captured.

In specific embodiments of the method, the designated physical area is a location within the retail location, such as a "hot-spot" purchase location that is geo-fenced such that location of the wireless communication device within the boundaries of the "hot spot" triggers automatic completion of the purchase transaction.

In other specific embodiments of the method, the designated physical area is a specified exit way leading from the retail location, such that when the customer, in possession of the wireless communication device, exits through the specified exit way, automatic completion of the purchase transaction ensues.

In other specific embodiments of the method, the designated physical area may an external perimeter of the physical location, such as a perimeter a predetermined distance from the physical location of the retailer (e.g., a perimeter located at or about the parking lot or the like). In such embodiments, once the customer, in possession of the mobile communication devices moves from inside the perimeter to outside the perimeter the purchase transaction will automatically occur. It should be noted that such an embodiments allows for the customer to leave the premises (i.e., the building in which the retailer is located) of the retail location without the purchase transaction having yet been completed.

In still a further embodiment of the method, the designated physical area is defined as a predetermined distance from where the indicia was captured. In such embodiments at time period may also be necessary to insure that the last-in-time captured indicia is the last product that the customer desires to purchase at the retail location during this particular shopping trip.

In optional embodiments of the method, once the purchase transaction is completed, a purchase receipt is generated by the system and communicated to the mobile communication device so that the customer has an indication that the transaction has occurred and has requisite proof of transaction. In specific embodiments, the customer may be required to show the receipt to a sales associate prior to departing the retail location as a means of verifying that the transaction occurred.

Figure 5:
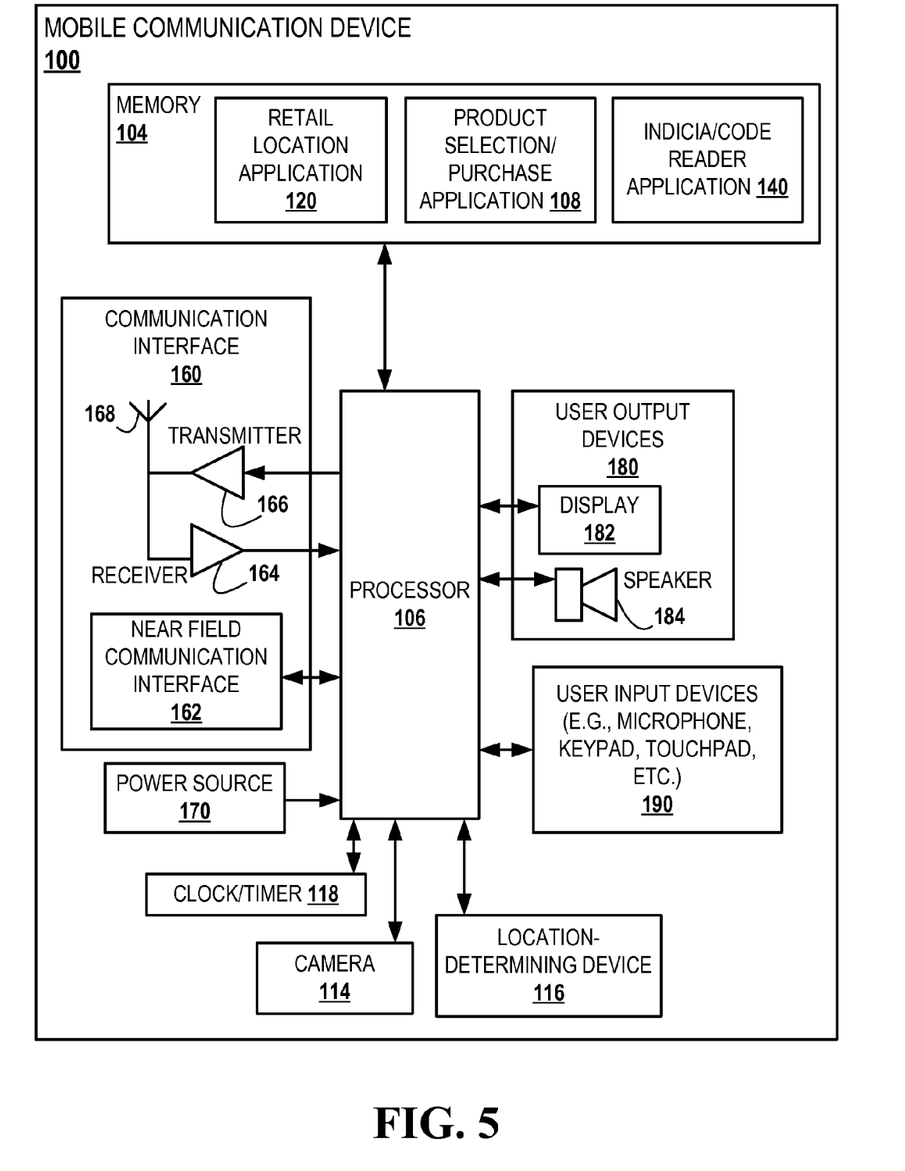
FIG. 5 is a more detailed block diagram illustrating a mobile communication device used as point of transaction for in-store purchases, in accordance with an embodiment of the invention.

Referring now to FIG. 5, a block diagram is provided that illustrates the mobile communication device 100 of FIG. 3 in more detail, in accordance with an embodiment of the invention. In some embodiments, the mobile communication device 100 is a mobile phone, but in other embodiments, the mobile communication device 100 can include and/or be embodied as any other mobile communication device described and/or contemplated herein. The mobile communication device 100 includes a processor 106 operatively connected to such devices as memory 104, user interfaces, such as user output devices 180 and user input devices 190, communication interface 160, power source 170, clock or other timer 118, a camera/image capture device 114, and a location determining device 116.

The processor 106 may include the functionality to encode and interleave messages and data prior to modulation and transmission. The processor 106 can additionally include an internal data modem. Further, the processor 106 may include functionality to operate one or more software programs, which may be stored in the memory 104. For example, the processor 106 may be capable of operating a connectivity program, such as a web browser application (not shown in FIG. 5). The web browser application may then allow the mobile communication device 100 to transmit and receive web content, such as, for example, location-based content and/or other web page content, according to a Wireless Application Protocol (WAP), Hypertext Transfer Protocol (HTTP), and/or the like.

The processor 106 is configured to use the communication interface 160 to communicate with one or more other devices on the network 300 (not shown in FIG. 5). In this regard, the communication interface 160 includes an antenna 168 operatively coupled to a transmitter 166 and a receiver 166 (collectively referred to as a "transceiver"). The processor 106 is configured to provide signals to and receive signals from the transmitter 166 and receiver 164, respectively. The signals may include signaling information in accordance with the air interface standard of the applicable cellular system of the wireless telephone network. In this regard, the mobile communication device 100 may be configured to operate with one or more air interface standards, communication protocols, modulation types, and access types. By way of illustration, the mobile communication device 100 may be configured to operate in accordance with any of a number of first, second, third, and/or fourth-generation and/or future generation communication protocols and/or the like. For example, the mobile communication device 100 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile communication device 100 may also be configured to operate in accordance with non-cellular communication mechanisms, such as via a wireless local area network (WLAN) or other communication/data networks.

The communication interface 160 may also include a near field communication (NFC) interface 162. As used herein, the phrase "NFC interface" generally refers to hardware and/or software that is configured to contactlessly and/or wirelessly send and/or receive information over relatively short ranges (e.g., within four inches, within three feet, within fifteen feet, or the like). The NFC interface 162 may include a smart card, key card, proximity card, Bluetooth® device, radio frequency identification (RFID) tag and/or reader, transmitter, receiver, and/or the like. In some embodiments, the NFC interface 162 communicates information via radio, infrared (IR), and/or optical transmissions. In some embodiments, the NFC interface 162 is configured to operate as an NFC transmitter and/or as an NFC receiver (e.g., an NFC reader, etc.). In some embodiments, the NFC interface 162 enables the mobile communication device 100 to operate as a mobile wallet. Also, it will be understood that the NFC interface 160 may be embedded, built, carried, and/or otherwise supported in and/or on the mobile communication device 100. In some embodiments, the NFC interface 160 is not supported in and/or on the mobile communication device 100, but the NFC interface 160 is otherwise operatively connected to the mobile communication device 100 (e.g., where the NFC interface 160 is a peripheral device plugged into the mobile communication device 100, etc.). Other apparatuses having NFC interfaces mentioned herein may be configured similarly.

The mobile communication device 100 can have a user interface that is, like other user interfaces described herein, made up of one or more user output devices 180 and/or user input devices 190. The user output devices 180 include a display 182 (e.g., a liquid crystal display (LCD) and/or the like) and a speaker 184 and/or other audio device, which are operatively coupled to the processor 106. The user input devices 190, which allow the mobile communication device 100 to receive data from a user such as the customer, may include any of a number of devices allowing the mobile communication device 100 to receive data from a user, such as a keypad, keyboard, touch-screen, touchpad, microphone, mouse, joystick, other pointer device, button, soft key, and/or other input device(s). The user interface may also include a camera 114, such as a digital camera, video camera or the like.

In some embodiments, the mobile communication device 100 also includes a location determining device 116 that can be used to determine the location of the mobile communication device 100. For example, the location determining device 116 may include a Global Positioning System (GPS) transceiver. In some embodiments, the location determining device 116 is at least partially made up of the antenna 168, transmitter 166, and receiver 164 described above. For example, in one embodiment, triangulation of cellular signals may be used to identify the approximate location of the mobile communication device 100. In other embodiments, the location determining device 116 includes a proximity sensor and/or transmitter, such as an RFID tag, that can sense or be sensed by devices known to be located proximate a merchant and/or other location to determine that the mobile communication device 100 is located proximate these known devices.

The mobile communication device 100 further includes a power source 170, such as a battery, for powering various circuits and other devices that are used to operate the mobile communication device 100. Embodiments of the mobile communication device 100 may also include a clock or other timer 118 configured to determine and, in some cases, communicate actual or relative time to the processor 108 or one or more other devices.

The mobile communication device 100 also includes a memory 104 operatively connected to the processor 106. As used herein, memory includes any computer readable medium (as defined herein) configured to store data, code, and/or other information. The memory 104 may include volatile memory, such as volatile Random Access Memory (RAM) including a cache area for the temporary storage of data. The memory 104 may also include non-volatile memory, which can be embedded and/or may be removable. The non-volatile memory can additionally or alternatively include an electrically erasable programmable read-only memory (EEPROM), flash memory or the like.

The memory 104 can store any of a number of applications which may include computer-executable instructions/code executed by the processor 106 to implement the functions of the mobile communication device 100 described herein. For example, the memory 104 may include such applications as a retail location application, 120, product selection/purchase application 108 and/or indicia/code reader application 140. It will be understood that the retail location application, 120, product selection/purchase application 108 and/or indicia/code reader application 140 can be, individually or collectively, operable (e.g., usable, executable, etc.) to initiate, perform, complete, and/or facilitate any one or more portions of the process flow 400 described herein.

Thus, methods, systems, computer programs and the like have been disclosed that provide for implementing a mobile communication device, such as a smart telephone or the like, as a point of transaction for in-store purchases, such that all a customer needs to do is capture the coded indicia of products they desire (i.e., scan the products) with their mobile communication device as they shop and the purchase transaction will subsequently occur based on either the customer (in possession of the mobile communication device) being physically located in a designated area of the store or the lapse of a predetermined period of time from when the coded indicia was captured.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for conducting purchase transactions within a retail location, the system comprising:
    a mobile communication device including a computing platform comprising a processor, a memory in communication with the processor, an image capture device in communication with the processor, a location-determining mechanism in communication with the processor and a time measurement mechanism in communication with the processor;
    a product selection application stored in the memory of the mobile communication, executable by the processor of the mobile communication device and configured to:
        implement the image capturing device to capture computer-readable indicia associated with one or more products that a customer desires to purchase, wherein the computer-readable indicia is captured prior to the customer encountering a check-out location within the retail location and, wherein the computer-readable indicia, when read by a computing device processor, provides information operable to purchase an associated product,
        implement the location-determining mechanism to determine that the mobile communication device has moved a predetermined distance from a location at which the computer-readable indicia was captured, wherein movement of the mobile communication device by the predetermined distance results in the product associated with the computer-readable indicia being queued for a purchase transaction, and
        implement the time measurement mechanism to determine when a predetermined period of time lapses, wherein the predetermined period of time starts when a first computer-readable indicia is captured by the mobile communication device at the retail location;
    a computing device including a computing platform comprising a processor and a memory in communication with the processor;
    a purchase transaction application stored in the memory of the computing device, executable by the processor of the computing device and configured to:
        receive, from the mobile communication device, the information associated with the one or more products queued for the purchase transaction, and
        conduct the purchase transaction of the one or more products for the customer in automatic response to receiving an indication from the mobile communication device that the predetermined period of time has lapsed.

2. The system of claim 1, wherein the customer is in a pre-existing trusted relationship with the retailer, and wherein the trusted relationship is operable to authorize the customer to conduct the purchase transaction.

3. The system of claim 1, wherein the purchase transaction application is further configured to, in response to conducting the purchase transaction, generate and initiate communication of a purchase receipt to the mobile communication device, wherein the receipt indicates that the customer has completed the purchase transaction of the one or more products.

4. The system of claim 1, wherein the purchase transaction application is further configured to, in response to receiving the information, generate and communicate a notification to a warehouse associated with the retailer, wherein the notification is operable to notify warehouse personnel of a need to ready the product associated with the information for presentation to the customer.

5. A method for conducting purchase transactions within a retail location, the method comprising:
- capturing, by an image capture device in a mobile communication device, computer-readable indicia associated with one or more products that a customer desires to purchase at a retail location, wherein the computer-readable indicia is captured prior to the customer encountering a check-out location within the retail location and, wherein the computer-readable indicia, when read by a computing device processor, provides information operable to purchase an associated product;
- determining, by a location-determining mechanism in the mobile communication device, that the mobile communication device has moved a predetermined distance from a location at which the computer-readable indicia was captured;
- in response to determining that the mobile communication device has moved the predetermined distance, queuing, by a mobile communication device processor, the product associated with the computer-readable indicia for a purchase transaction;
- determining, by a time measurement mechanism in the mobile communication device, that a predetermined period of time has lapsed, wherein the predetermined period of time starts when a first readable-indicia is captured by the mobile communication device at the retail location;
- communicating wirelessly, by the mobile communication device, the information associated with the one or more products queued for the purchase transaction to a purchase transaction system associated with the retailer; and
- in response to receiving the information, conducting, by a computing device processor within the purchase transaction system, a purchase transaction of the one or more products in automatic response to receiving an indication from the mobile communication device that the predetermined period of time has lapsed.

6. The method of claim 5, wherein the customer is in a pre-existing trusted relationship with the retailer, wherein the trusted relationship is operable to authorize the customer to conduct the purchase transaction.

7. The method of claim 5, further comprising, in response to conducting the purchase transaction, communicating, to the mobile communication device, a purchase receipt that indicates that the customer has completed the purchase transaction of the one or more products.

8. The method of claim 5, further comprising in response to receiving the information, communicating, by a computing device processor, a notification to a warehouse associated with the retailer, wherein the notification is operable to notify warehouse personnel of a need to ready a product associated with the information for presentation to the customer.

9. A computer program product, the computer program product comprising a non-transitory computer-readable medium having computer-executable instructions to cause a computer to implement the steps of:
- capturing, by an image capture device in a mobile communication device, computer-readable indicia associated with one or more products that a customer desires to purchase at a retail location, wherein the computer-readable indicia is captured prior to the customer encountering a check-out location within the retail location and, wherein the computer-readable indicia, when read by a computing device processor, provides information operable to purchase an associated product;
- determining, by a location-determining mechanism in the mobile communication device, that the mobile communication device has moved a predetermined distance from a location at which the computer-readable indicia was captured;
- in response to determining that the mobile communication device has moved the predetermined distance, queuing the product associated with the computer-readable indicia for a purchase transaction;
- determining, by a time measurement mechanism in the mobile communication device, that a predetermined period of time has lapsed, wherein the predetermined period of time starts when a first readable-indicia is captured by the mobile communication device at the retail location;
- communicating wirelessly the information associated with the one or more products queued for the purchase transaction to a purchase transaction system associated with the retailer; and
- in response to receiving the information, conducting, by a computing device processor within the purchase transaction system, a purchase transaction of the one or more products in automatic response to receiving an indication from the mobile communication device that the predetermined period of time has lapsed.

10. The computer program product of claim 9, wherein the steps further comprise, in response to conducting the purchase transaction, communicating, to the mobile communication device, a purchase receipt that indicates that the customer has completed the purchase transaction of the one or more products.

11. The computer program product of claim 9, wherein the steps further comprise, in response to communicating receiving the information, communicating, a notification to a warehouse associated with the retailer, wherein the notification is operable to notify warehouse personnel of a need to ready the product for presentation to the customer.

* * * * *